July 26, 1938.   A. C. JENKING ET AL   2,124,737
DIFFUSION SYSTEM FOR ILLUMINATION
Filed Sept. 26, 1934   2 Sheets—Sheet 1
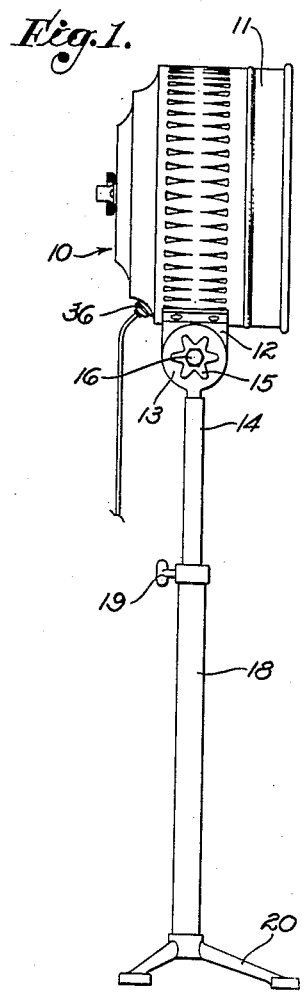
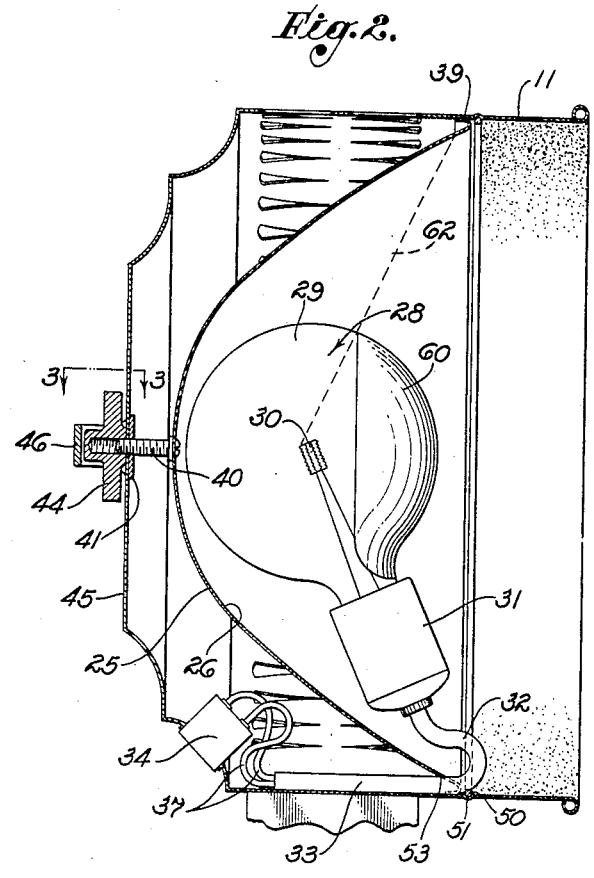
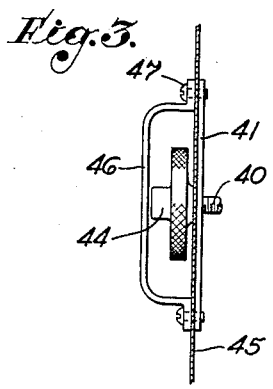
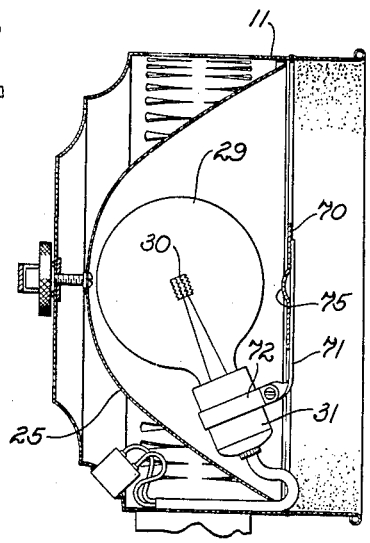
INVENTORS
ALLEN C. JENKING
ROY C. BECK
BY
ATTORNEY.

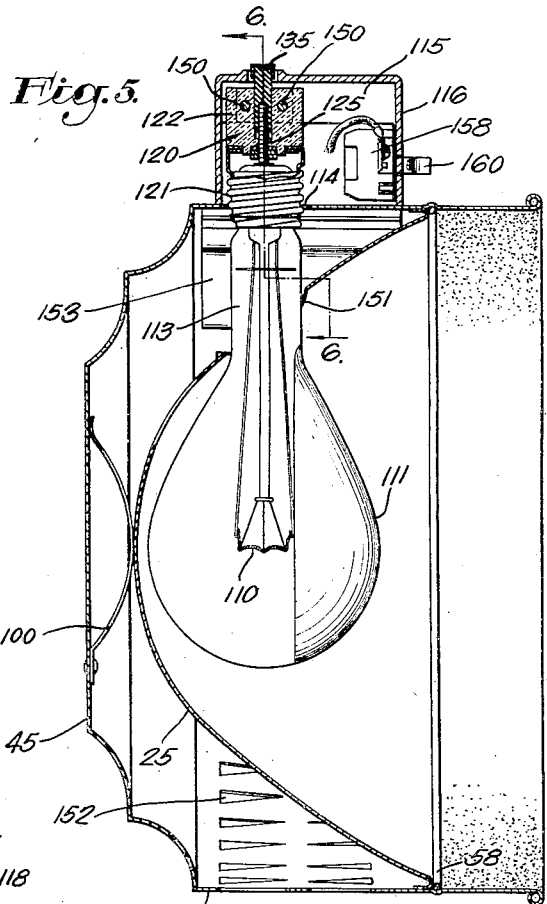
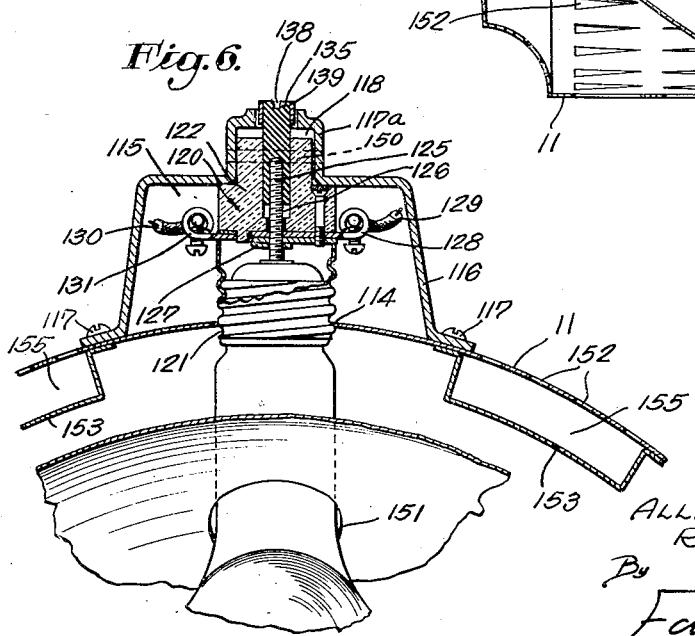

Patented July 26, 1938

2,124,737

UNITED STATES PATENT OFFICE 2,124,737

DIFFUSION SYSTEM FOR ILLUMINATION

Allen C. Jenking and Roy C. Beck, Los Angeles, Calif., assignors to Vitachrome, Inc., Los Angeles, Calif., a corporation of California Application September 26, 1934, Serial No. 745,582

8 Claims. (Cl. 240—41.35)

Our invention relates to lamps, and more particularly to a novel diffusion lamp of extremely high efficiency in producing an extremely diffused beam of light.

One system now used in an attempt to secure uniform illumination utilizes expensive and accurately ground mirrors, usually formed on a glass base, designed to focus all of the light rays emanating from a source so as to form a beam of light which theoretically will be of equal intensity in all portions thereof. To some degree such a system accomplishes these results, but perfection is never attained in view of several factors including the impossibility of securing a point light source. Present-day filaments or arcs inevitably comprise sources of considerable radiating surface or area. Furthermore, such surfaces or areas are not of uniform incandescence throughout but vary at different sections thereof. Such a mirrored system inevitably reflects an image of the source, a factor to be avoided in the present invention.

Further, the cost of such mirrors is relatively high, so that the completed lamp is relatively expensive. So also, such mirrors are relatively heavy and greatly increase the weight of the finished lamp and render its portable use difficult. Further, even with such mirrored systems the direct rays from the filament or arc are transmitted to the subject with the inevitable result that the illumination is non-uniform. Such lamps also produce extreme glare and a large amount of heat. Thus, in the motion-picture industry the requisite intensities are such that extreme eye strain is produced, as well as other physical and mental strains on the actors, especially when photographing by well-known color processes. In this industry the usual practice is to use a large number of high-intensity lamps with overlapping beams in an attempt to give uniform illumination and eliminate the "hot spots" which are produced in a given beam. So also, in the flood lighting of buildings or window displays an excessively large number of lamps are necessary to secure even illumination.

In another system at present in use diffusion and uniform illumination are effected by the use of condenser lenses between the light source and the subject. While such condenser lenses are fairly satisfactory in smaller lamps, they are invariably expensive, and their first cost, as well as their excessive weight, precludes their use in large lamps. Further, a relatively large percentage of the available light is lost by absorption in the glass.

Still another system used in an attempt to secure diffusion and uniform illumination involves placing a translucent screen between the lamp and the subject, this system usually being used in conjunction with the relatively expensive mirror. Such a system is defective in that a very large percentage of the otherwise available light is absorbed by the screen, this screen being usually made of silk, cheese-cloth, opal glass, or the like. Such systems are notoriously inefficient.

The present application is directed to a system in which no expensive reflectors are utilized and in which no translucent or transparent means need be utilized to secure diffusion, and it is an object of the present invention to produce a system of this type in which efficiencies are much higher than in previously designed lamps, and which is of light weight and low first cost.

It is a further object of the invention to provide a diffusion lamp utilizing a novel light-diffusing system involving a diffusing member which will not project a visible image of the source, as distinct from previously used polished surfaces acting to reflect and focus the rays and which inevitably produce such a visible image of the source.

It is a further object of the invention to use a diffusing member having what is in effect a granular surface used for diffusing purposes and formed, for instance, by chemical etching, by engraving, or by mechanical means so as to provide a surface with relatively fine grains.

It is a further object of the invention to provide a front-surface diffusion member acting to very effectively diffuse the light and which, in the preferred embodiment, is directly exposed to the light rays without the use of any diffusing media between the source and the diffusing surface, and which eliminates the necessity of any diffusing media between the subject and this diffusing member.

This diffusing member can be made of various materials, but a superior diffusing action and very high efficiencies are obtained by making this member of metal, preferably a non-tarnishing metal such as aluminum, and it is an object of the invention to utilize such a metallic diffusing member in the preferred embodiment of the invention.

It is another object of the invention to provide a lamp giving a diffused color-corrected beam of actinic nature approaching natural sunlight.

We have found it desirable to shield the subject from the direct rays of the filament or other source, and it is an object of the present invention to provide such a system which is of novel construction.

In shielding the subject from these direct rays we prefer to use a reflector between the source and the subject. While this reflector may be formed in various ways, we prefer in one embodiment to form a reflecting surface directly upon the glass bulb of the light source, if an incandescent electric light is being utilized. We are aware that attempts have previously been made to apply a coating of mercury, for instance, to the surface of a gas-filled incandescent light bulb for the purpose of forming a reflector, but it has heretofore been found impossible to form such a reflecting surface which will withstand the extreme temperatures necessarily developed when the filament is illuminated. All of such reflecting coatings previously used on such a gas-filled bulb quickly disintegrate by cracking or oxidation when the lamp is illuminated.

It is an object of the present invention to provide a lamp structure including a reflector adjacent the light source which will not deteriorate when exposed to the heat rays emanating from the light source, and in one embodiment to provide a reflecting surface applied directly to the glass bulb of the light source which surface will neither crack nor oxidize even with prolonging usage.

In forming such a reflecting coating we utilize a process in which a metal of high-melting point is vapor-deposited on the glass under a very high vacuum, this being accomplished by bringing vapors of the metal into contact with a portion of the glass exposed through a suitable mask which determines the shape of the coating thus deposited. It is an object of the present invention to utilize such a vapor-deposited coating on the bulb or on other supporting means as one element of a lamp structure.

It is a further object of the invention to provide a novel heat-resisting protective coating for such a vapor-deposited reflecting coating of metal.

Aluminum has been found to be very well suited for such a coating for several reasons. In the first place, it will not evaporate at the existing temperatures developed by the source. So also, it will not oxidize or crack under these temperatures. Further, it absorbs very little of the total light, especially the violet rays present, being much superior in this regard to most other metals. The rays which it does absorb are predominantly the yellow and red rays, a very desirable result when attempting to get actinic values closely approximating those in natural sunlight.

In our diffusion lamp we have found that best results accrue from the combined use of a vapor-deposited mirror in conjunction with a diffusion member having a granular surface, and the ability of our lamp to operate at such high efficiencies when delivering the very diffused light is largely attributable to this combination. The provision of a lamp utilizing such elements in combination is among the objects of the present invention.

It is a further object of the invention to provide a novel system permitting relative movement between the light source and the diffusion member.

A further object of the invention is to provide a novel structure delivering current to the light source through a suitable socket and to mount this socket in a novel manner.

A further object of the invention is to provide a novel socket structure permitting angular adjustment of the light source.

Further objects of the invention lie in the provision of a novel housing and a novel ventilation system for a lamp.

Still further objects and advantages of the invention will be made evident to those skilled in the art from the following description.

In the drawings we have chosen to illustrate the preferred embodiment of our invention in the form of a flood-lamp.

Referring to these drawings,

Fig. 1 is a side elevational view of the complete lamp.

Fig. 2 is a vertical sectional view of the lamp, illustrating the constructional details thereof.

Fig. 3 is a sectional view taken on the line 3—3 of Fig. 2.

Figs. 4 and 5 are vertical sectional views of alternative forms of our lamp.

Fig. 6 is a section taken on the line 6—6 of Fig. 5.

Referring particularly to Fig. 1, the lamp of our invention is indicated in general by the numeral 10 and provides a housing 11. To this housing a pair of brackets 12 is suitably connected, the downward extending portions of these brackets forming a tongue fitting between two plates 13 which are in turn connected to a post 14. The plates 13 resiliently engage the tongue through the action of any desirable clamping means. In the embodiment shown this clamping means includes one or more multi-fingered springs 15 resiliently engaging the plates 13 through the action of a bolt 16. Tightening the bolt thus increases the frictional action throughout the system and clamps the housing 11 in any desired position. In some instances only one of the plates 13 need be used. The post 14 in turn extends into a tube 18, being adjustably clamped relative thereto by any suitable means such as a thumb screw 19. Legs 20 support the tube 18 and the other elements of the structure.

As best shown in Fig. 2 a diffusion member 25 is positioned in the housing 11 and acts to diffuse and deflect light rays toward the subject to be illuminated. In the embodiment shown the diffusion member 25 is of parabolic form, though this is not essential to the invention. The shape of this diffusion member can be changed to meet different conditions, assuming any one of the various curves known in the art. In some instances it is entirely practical to use a diffusion member which is not curved, though a curved form usually produces the best results in that it permits a greater concentration of the resulting beam.

A forward surface 26 of the diffusion member 25 presents a front-surface diffusing means which faces the subject to be illuminated. In the preferred embodiment of the invention this surface is of a granular nature, presenting a multitude of small surfaces to the light rays to evenly diffuse the light. The preferred method of forming this surface is by a chemical etching process, using an acid or a base which reacts with the metal, or using both an acid and a base successively. Other methods of obtaining such a granular surface can be used, such as by mechanical means, cutting, chipping, or grinding the surface to form the small grains, or by suitably engraving the surface, as well as by other means which will form a granular surface with grains of relatively small size.

Usually, though not invariably, this member is formed of metal, and we have found that aluminum is very satisfactory because of its non-tarnishing characteristic and because it absorbs only a small fraction of the total light. Its light-diffusing properties are also better than certain other metals, and it will be readily appreciated that the cost of a diffusion member formed of aluminum is relatively low, especially as compared to the massive mirrors which have previously been used to reflect and focus the light rays rather than deflect and diffuse the light rays as in the present invention. In addition our tests very definitely show that the diffused beam from such an aluminum diffusion member has actinic values very close to natural diffused sunlight. In this connection the red and yellow rays tend to be absorbed by the aluminum diffusion member, thus removing excessive quantities of these red and yellow rays and forming a beam containing large amounts of violet rays, the aluminum having the property of not absorbing these violet rays. The resulting beam is thus very satisfactory in photographic work. Such a diffusion member with a granular surface is of a relatively brilliant nature but will not form an image. It acts as an excellent diffuser and at the same time deflects the diffused rays to the subject to be illuminated, giving an even illumination over all of the surface thereof without image formation, glare, flare, or strain.

Disposed in front of the diffusion member 25 in the form shown is a light source indicated in general by the numeral 28. While various light sources can be used, we have found that the most satisfactory source for all but the largest types of lamps is an incandescent electric light including a glass bulb 29 with a light-producing means 30 therein, usually in the form of a tungsten filament. The shape of this bulb 29 can be varied to meet different situations, but we have found that the ordinary spherical bulb of the "G" type as shown in Fig. 2 can be satisfactorily used if desired. A socket 31 holds this light source in proper position in the housing 11. In one form of the invention we find it preferable to position this socket as shown, thus not necessitating extending the socket through a hole formed in the diffusion member. A pipe 32 is secured to the socket and is shown as being in the form of a gooseneck, extending outward from the socket and across the forward end of the diffusion member 25, and providing a rearward extending portion 33 which is suitably secured to the inner wall of the housing 11 by means not shown. In this form of the invention a plug member 34 may be secured in the housing 11 to the rear of the diffusion member 25 and is adapted to receive a plug 36 (see Fig. 1). Conductors 37 extend from the plug member 34 through the pipe 32 to energize the light source 28.

It is often desirable to be able to change the relative positions of the diffusion member 25 and the light source 28. This is accomplished in the embodiment shown in Fig. 2 by making the diffusion member 25 slidable in the housing 11. The forward end of the diffusion member 25 may be bent back to form a bead 39 which slidably engages the inner wall of the housing 11. A suitable adjustment is provided for moving this diffusion member, the adjustment means illustrated including a screw 40 providing a relatively flat head which is secured to the diffusion member 25. This screw extends rearward through a reinforcing plate 41 and is threaded into a thumb-nut 44 which is retained in position between a rear wall 45 of the housing and a handle 46 suitably secured to the housing and to the reinforcing plate 41 as by screws 47. The distance between the handle and the rear wall 45 is only slightly greater than the thickness of the thumb-nut 44. By turning this thumb-nut, the diffusion member 25 moves forward and rearward relative to the light source. The extreme forward movement is limited by a suitable stop means shown in the form of a split ring 50 fitting into an arcuate channel 51 of the housing. The structure may be so designed that the diffusing member will engage this split ring before any portion of this member engages the light source. The maximum retracted position of the diffusion member 25 is controlled by engagement of the screw 40 and the bottom wall of the threaded cavity of the thumb-nut 44, or by other suitable means.

If desired, the rearward extending portion 33 of the pipe 32 may be used to guide the movement of the diffusion member 25. This may be accomplished by providing a suitable channel in this diffusion member, the portion 33 of the pipe extending therein. In the preferred embodiment this channel may be formed by a groove 53, this groove being of such size as to slidably engage the portion 33 of the pipe 32.

We have found it desirable to shield from the subject any direct light rays emanating from the filament of the light source. This may be accomplished by positioning an opaque body in the path of these direct rays, but we prefer to utilize a reflector in this capacity. Such a reflector may be disposed between the filament and the subject to be illuminated, preferably adjacent the forward portion of the bulb 29. The reflecting surface acts to reflect any light rays which would otherwise move directly toward the subject, reflecting these rays so that they come into contact with the diffusion member 25 or other member in the rear of the housing 11 whence they are deflected to move toward the subject. In the embodiment shown in Fig. 2 we utilize a coating 60 applied directly to a portion of the bulb 29.

As previously mentioned, attempts to apply conventional reflecting coatings to such a gas-filled bulb are not practical in view of the high temperatures to which the bulb is necessarily subjected. We have found that this problem can be solved by vapor-depositing on the surface of the bulb a coating of metal. Various metals may be used in this capacity, but we have found that aluminum is desirable from several standpoints. Most important, it is extremely stable when in place and will not crack or evaporate from the glass under the conditions of heat to which it is subjected. Further, an aluminum coating forms a reflecting surface of extremely high efficiency, absorbing only a negligible part of the violet light rays, a coating of vapor-deposited aluminum forming a nearly perfect reflecting surface. In addition, such an aluminum reflector assists in absorbing some of the red and yellow rays, allowing an ordinary incandescent bulb to be used, either with or without the diffusion member 25, to form a beam of light which closely approximates natural sunlight in actinic value. Further, the aluminum will not tend to oxidize or evaporate, and our experiments show that such a vapor-deposited coating of aluminum will outlast the filament itself. Other metals may be thus vapor-deposited if of a character having satisfactory reflecting properties and if of sufficiently high boiling point so as not to vaporize when the lamp is in use.

The process of applying this coating involves the positioning of the aluminum or other metal to be used for coating purposes in a crucible, the lamp being mounted above the crucible, a suitable mask being utilized so that only that portion of the bulb 29 which is to be coated will be exposed to the metallic vapors which are liberated in the process. The whole structure is enclosed in a container which is then evacuated, the aluminum, or other metal, being then heated until such time as the metal will go into a vaporous form in the presence of the high vacuum which is maintained. The vapors will rise to the exposed portion of the bulb and be deposited thereon to form a tenacious coating. It is neither desirable nor necessary that this coating be relatively thick. The process can well be stopped after a layer of aluminum has been deposited which is not more than a few molecules thick. In fact, it is only necessary to deposit a sufficient amount of aluminum to completely cover the exposed area of the bulb to form an opaque coating which will prevent passage of the light rays. If the coating is made too thick, the deposited metal tends to form what is in effect a plate, and under the extremely high temperatures to which the bulb is subjected, the bond between this plate and the glass may be destroyed due to the fact that the metal and glass have different coefficients of expansion. Thin coatings are thus desirable.

After the bulb has been removed from the apparatus a heat-resisting protective coating is placed over the deposited surface, for which such thin surfaces the coating can be very easily scratched. Sometimes a coating of heat-resisting varnish, lacquer, etc., is sufficient, but we prefer to vapor-deposit a second thin protecting coating of metal directly on the coating of reflecting material by substantially the same process previously described. Copper is very useful in this regard though other metals can be used. Such a protective coating not only protects the thin reflecting coating but increases its opacity, a factor which is important if the coating of the reflecting material is so thin as to not be completely opaque. A final coating of heat-resisting varnish, lacquer, etc., can be applied to the protective coating.

The coating 60 should be of such dimension as to prevent any direct light rays from reaching the subject to be illuminated. Preferably it should be of such size as to prevent the passage of any direct light rays from the filament through the opening defined by the front of the housing, though this is not always essential. Further, it is desirable in certain installations to prevent any direct light ray from reaching the housing 11 in front of the forward edge of the diffusion member 25. Such a system is shown in Fig. 2, the most extended ray being indicated by the numeral 62 and impinging on the diffusion member 25 just to the rear of the forward edge thereof. A superior diffusion action is obtained by such a a positioning of the reflecting coating 60. If the bulb 29 is utilized in the position shown, it is sometimes desirable to extend the coating 60 around a portion of the neck of the bulb, it being understood that the placement of the coating is dependent upon the angular position of the bulb in the complete structure.

In Fig. 4 we have illustrated an alternative construction especially useful when using sources of extremely intense character, such as incandescent lamps of 750-watt rating or above, though it can also be used in smaller lamps. Here no reflecting coating is applied directly to the bulb. Instead, a front-surface reflector 70 is used adjacent the forward portion of the bulb, being secured to an arm 71 which is pivoted or otherwise connected to a support such as a clamping means 72 extending around the socket 31. The superior reflecting powers of a vapor-deposited coating make it desirable to vapor-deposit aluminum or other metal on a suitable backing to form the reflector 70. This reflector may be suitably curved or can be made substantially flat as shown so that the reflected rays reach substantially all portions of the diffusion member 25. It is sometimes preferable to utilize a convex surface 75 centrally disposed with respect to the reflector 70 to spread the reflected rays, thus providing a front-surface convex reflecting surface, preferably formed with a vapor-deposited coating applied at the same time that the remainder of the reflector 70 is coated. This reflector 70 need not be made sufficiently large to shield all direct rays from the outer portions of the beam, though it can be made of sufficient size to accomplish these results if desired, or the housing 11 can be extended forward a sufficient distance to accomplish this result. If the direct rays are not eliminated from the edge portions of the beam it is usually desirable to use only the central diffused cone of light for illuminating the desired portion of the subject, though in some instances these direct rays may not be objectionable.

Another form of the invention which finds particular utility in commercial use due to its superior efficiency and lower cost of manufacture is disclosed in Figs. 5 and 6. The shapes of the housing 11 and the diffusion member 25 are substantially the same as previously described. In this form of the invention, however, the diffusion member is not adjustably mounted but is resiliently urged against the split ring 56 by any suitable means such as a spring 100 secured to the rear wall 45.

This form of the invention is particularly designed for use with incandescent bulbs of the P. S. (pear-shaped) type commercially available at low cost and providing a filament 110 shaped substantially as shown. A shielding means in the form of a high efficiency reflector 111 is applied to one side of the bulb in a manner previously described, being of such size as to prevent direct rays from reaching the subject to be illuminated. While bulbs of this type cannot ordinarily be used with success in lamps including reflectors designed to focus the rays, this type of bulb is very satisfactory for use in our general combination including the diffusion member 25. In fact, this type of bulb used in conjunction with our general combination including the diffusion member 25 and the shielding means 111 not only effects a very material saving in cost of manufacture, but actually makes possible higher lamp efficiencies.

Such an incandescent bulb provides a neck 113, and we have found it preferable in this embodiment to mount the lamp so that this neck extends upward. All incandescent lamps tend to become slightly blackened with continued use, this blackening taking place in the uppermost portion of the bulb. By extending the neck 113 in an upward direction we have found that any tendency toward blackening will be confined to the neck 113. If this neck were not vertical, the larger-diameter portion of the bulb which was uppermost would be blackened, thus tending to form a beam of unequal illumination due to the decreased amount of light which is transmitted through such a darkened portion. This feature is of especial importance when a reflecting surface is applied to the periphery of the bulb.

In this form of the invention the screw-threaded base of the incandescent bulb extends upward through an opening 114 in the housing 11 and into a chamber 115 formed by a dome or upper structure 116 which is secured to the housing 11 by any suitable means such as screws 117 shown in Fig. 6. This dome may be formed with a head 117a elongated in a direction parallel to the axis of the beam to provide a chamber 118. Disposed in the dome 116 is a socket means adapted to receive the base of the incandescent bulb, this socket means being indicated in general by the numeral 120. If desired, this socket may be of the ordinary mogul type including a threaded contact member 121 receiving the base and suitably secured to a support 122 formed of insulating material. However, we prefer to modify the usual base structure to provide an adjustable contact means to permit the supplying of current to the bulb when this bulb is in a desired angular position. In the embodiment shown a screw 125 may form this adjustable contact means, extending from a cavity 126 of the support 122 in threaded relationship with an opening formed in a contact member 127. This contact member may be the usual central contact of a mogul-type base, flattened as shown and threaded to receive the adjustable contact member 125. Current is supplied to this member 127 through a conducting bar 128 secured to a wire 129 in the usual manner. Similarly, current may be conducted from a wire 130 to the threaded contact member 121 through a conductor 131 in the usual manner.

To permit adjustment of the adjustable contact member 125 without danger to the operator, we prefer to utilize an adjustment member 135 which may take the form of a block of insulating material extending into the cavity 126 so as to be rotatable therein, providing a threaded opening receiving the upper end of the adjustable contact member 125. Thus, this adjustment member 135 in effect forms an extension for the adjustable contact member 125. A slot 138 may be provided in the upper end thereof to receive a screw driver or other means. So also, the upper end of this member 135 is preferably protected by a ring 139 extending therearound, the upper end of the adjustment member 135 extending through an opening formed in the upper end of the head 117a.

The advantage of such a socket construction will be apparent. In the absence of an adjustable means the coating on the bulb will not necessarily be in the desired shielding position shown in Fig. 5. By providing a suitable means for adjusting the socket means to permit retention of the bulb in any desired position, this difficulty is overcome. Thus, with the system shown the bulb may be screwed into the socket with the adjustment member 125 retracted, and turned to such a position that the coating is directly in front of the filament. Thereafter the adjustable contact member 125 can be lowered into contact with the central terminal of the base of the bulb, this being effected by turning the adjustment member 135. The advantage is twofold in that it permits accurate placement of the coating on the bulb and also positively clamps the bulb so that vibration will not change the angular position thereof or cause the bulb to be wholly or partially unscrewed from the socket means. It will be understood, however, that other types of socket means may be utilized in this capacity including a rotatable current delivery means permitting adjustment of the bulb so that the coating thereon is in the desired position.

Any suitable means may be used for retaining the socket means in the dome 116. If desired, this socket means may be movably mounted to adjust the position of the light bulb, but in the embodiment shown pins 150 extend through the side walls of the head 117a and through that portion of the support 122 extending into the chamber 118, thus retaining the base structure in fixed position. A suitable opening 151 is provided in the diffusion member 25 to permit passage of the neck 113 and may be slightly elongated in the event that an adjustable support for the base means is utilized.

To prevent any leakage of light through this opening and from ventilating ports 152 formed in the housing 11, we prefer to position a baffle 153 on each side of the socket near the upper end of this housing. Such baffles may be held in place by the screws 117 and provide chambers 155 open at the forward and rearward ends to give adequate space for the heated air to circulate outward through the openings 152.

We usually find it desirable to mount a switch 158 in the forward portion of the dome 116, an operating member 160 extending externally for manual control of the switch. This switch is connected in series with the filament 110 through the conductor members 128 and 131 previously described. A dome structure shaped as shown forms a very convenient means which can be engaged by the hand of the operator to adjust the position of the lamp relative to its support.

The construction illustrated in Fig. 5 is particularly important in that it eliminates any necessity for using expensive pre-focused sockets and special types of bulbs. It also permits the use of cheaper bulbs which in reality give better efficiencies in the lamp structure than the spherical type of bulb indicated in Fig. 2.

We believe that several of the features of the present invention are novel and it should not be understood that we are limited to the complete combination shown in Figs. 2, 4, or 5, certain of these features being novel irrespective of their inclusion in the general combination. However, the general combination shown gives quite unexpected results. The positioning of an object in the beam between the lamp and the subject will not produce a shadow on the subject unless the object is very close thereto. Even if the object is in close proximity to the subject, the outlines of the shadow are extremely diffused. At distances of more than a few feet from the subject any object in the path of the beam will cast no discernible shadow, a very important factor in certain installations. Furthermore, the intensity of the beam is uniform at all corresponding sections thereof. Photometric tests substantiate this fact. Further, the heat rays in the beam appear to be noticeably absent at distances of more than a few feet from the lamp. The subjection of the back of one's hand to the beam and moving the hand from the vicinity of the lamp toward the subject indicate that the temperature gradient very quickly falls off as the distance from the lamp increases, and at a distance of a few feet there appears to be a very definite point beyond which no heat can be noticed by this test. This feature is of special importance when the lamp is used for photographic purposes, or for other purposes where it is desired to have a high-intensity beam with a minimum of heat, such as in surgical or dental work.

Our tests have further shown that with an aluminum reflector and diffusing member the resulting beam is of an actinic value closely approaching diffused sunlight. This result accrues primarily from the use of an aluminum reflector or diffusion member or both, these aluminum members accounting for the production of a diffused beam properly balanced in its three primary colors to produce a beam closely approximating in actinic value natural diffused sunlight. This property of our lamp is of particular value in many capacities, especially in photographing polychromatic subjects and copying and portrait work.

Furthermore, the lamps as shown in Figs, 2, 4, and 5 are free from glare. One can look directly into the beam without excessive eye strain. The very efficient diffusion action is effected by the use of the granular surface each grain of which tends to diffuse the rays of light reaching same.

It is neither necessary nor desirable that any translucent means be utilized. Thus, the provision of a front-surface diffusion member permits direct exposure to the light rays without interpositioning of any diffusing media. The use of any coating of lacquer, varnish, or the like on the granular surface will not only greatly decrease the light efficiency of the lamp but will interfere with the diffusion and will produce glare. The use of a front-surface diffusion member with no coating thereon and directly exposed to the direct and reflected light rays is an important feature of the invention if efficiency is to be a factor and coatings or other diffusing media will not permit accomplishment of the desirable results accruing from the use of our lamp.

If it is desired to make the boundary of the beam gradually fade off, with no discernible edge effect, the interior of the housing in front of the diffusion member 25 may be made of dark color and with a relatively dull finish, or any member can be used which is thus formed and which extends forward from the diffusion member 25. The material forming the housing, or such forward-extending member may be selected to have these properties, or a coating may be applied thereto. The addition of this feature results in the production of a beam which has no definitely discernible boundary, the light intensity fading off very gradually. Such a result is of very great importance when using a plurality of lamps with overlapping beams or illuminating a relatively large subject, as well as in certain photographic work where a single beam is thrown on a subject to illuminate only a portion thereof and produce a photographic image of the illuminated portion which appears to be vignetted.

We claim as our invention:

1. In combination in a high-efficiency lamp for directing a beam toward a subject: a light source comprising an incandescent electric light bulb with a filament therein and provided with a screw-type base; shielding means adjacent one side of said light bulb and movable therewith when said bulb is being placed in position for shielding from said subject the direct light rays from said filament; a diffusion member in back of said light bulb and facing said subject and providing a granular surface for forming said beam; and socket means for said bulb and including a rotatable current-delivery means supplying current to said lamp, rotation of said current-delivery means permitting adjustment of said light bulb to position said shielding means directly in front of said rear member and in position between said filament and said subject.

2. In combination in a high-efficiency diffusion lamp for directing a diffused beam toward a subject: a diffusion member providing a granular surface facing the subject to be illuminated; a light source comprising an incandescent electric light bulb with a neck extending upward whereby any blackening of said bulb after prolonged use takes place in said neck rather than around the periphery of said bulb, said light bulb including a filament; a vapor-deposited coating on one side of said bulb and adapted to be disposed between said filament and said subject to shield said subject from the direct rays of said filament; and means for adjustably mounting said incandescent light bulb to permit an angular positioning thereof in which said vapor-deposited coating is disposed between said filament and said subject.

3. In combination in a diffusion lamp for directing a diffused beam of light toward a subject without the use of transparent or translucent diffusing media: a diffusion member providing a clean metallic surface of granular nature facing the subject to be illuminated; a light source comprising an incandescent electric light bulb including a filament positioned in front of said diffusion member; and a vapor-deposited metallic reflecting surface between said filament and said subject and of sufficient size to shield said subject from all direct rays from said filament whereby all of the rays from said filament reach said diffusion member either directly or by reflection from said reflecting surface and whereby all of the rays illuminating said subject reach said subject from said diffusion member.

4. In combination in a diffusion lamp for directing an intense diffused beam of light toward a subject without the use of transparent or translucent diffusing media: a curved metallic diffusion member presenting to said subject a concave clean chemically-etched surface; a light source comprising an incandescent electric light bulb including a filament and positioned in front of said diffusion member; a vapor-deposited reflecting coating applied directly to the forward external surface of said bulb to leave no intervening space therebetween, said coating being of such size as to shield said subject from all direct rays from said filament and extending rearward around the periphery of said bulb to terminate in a rear edge positioned forward of the rearmost portion of said filament whereby light rays may move radially outward from said rearmost portion of said filament to said diffusion member; and a member extending forward from the periphery of said diffusion member and forward from said chemically-etched surface thereof and providing an inner surface of dull character and of dark color.

5. In combination in a diffusion lamp particularly suited to photographic use and directing a diffused beam toward a subject: a diffusion member providing a clean chemically-etched metallic surface facing said subject; an incandescent electric light bulb providing a filament and positioned between said diffusion member and said subject; and a thin vapor-deposited reflecting surface applied directly to the forward exterior surface of said incandescent electric light bulb to be supported thereby and to conform exactly to the surface of said bulb thereby eliminating any space therebetween, said vapor-deposited reflecting surface reflecting light rays rearward to said metallic diffusion surface and being of sufficient size to shield said subject from any direct rays from said filament.

6. In combination in a diffusion lamp particularly suited to photographic use and directing a diffused beam toward a subject: a diffusion member providing a clean granular metallic surface facing said subject; an incandescent electric light bulb providing a filament positioned between said diffusion member and said subject; and means for illuminating said subject exclusively by diffused rays from said diffusion member so far as said diffusion lamp is concerned, said means including a thin vapor-deposited reflecting surface applied directly to the forward exterior surface of said incandescent electric light bulb to be supported thereby and to conform exactly to the external surface of said bulb in the area covered thereby eliminating any space therebetween, said vapor-deposited reflecting surface reflecting light rays rearward to said diffusion surface and being of such size as to shield said subject from all direct rays from said filament and to intercept substantially none of the rays which would reach said diffusion member from said filament in the absence of said reflecting surface.

7. In combination in a diffusion lamp particularly suited to photographic use and directing a diffused beam toward a subject: a curved diffusion member providing a clean granular metallic surface facing said subject; an incandescent electric light bulb providing a filament and positioned between said diffusion memebr and said subject, a thin metallic vapor-deposited reflecting surface not more than a few molecules thick thereby resisting cracking due to heat and applied directly to the forward exterior surface of said incandescent light bulb to be supported thereby and to conform exactly to the surface of said bulb in the area covered by said reflecting surface thereby eliminating any space therebetween, said vapor-deposited reflecting surface reflecting light rays rearward to said metallic diffusion surface and being of sufficient size to shield said subject from any direct rays from said filament; and a heat-resistant coating covering and adhering to the forward surface of said vapor-deposited metallic reflecting surface to confine said vapor-deposited reflecting surface between said bulb and said coating.

8. A combination as defined in claim 5 in which said diffusion member is formed of aluminum and in which said vapor-deposited reflecting surface comprises a thin vapor-deposited and opaque coating of aluminum only a few molecules thick.

ALLEN C. JENKING.
ROY C. BECK.

CERTIFICATE OF CORRECTION.

Patent No. 2,124,737. July 26, 1938.

ALLEN C. JENKING, ET AL.

It is hereby certified that error appears in the printed specification of the above numbered patent requiring correction as follows: Page 2, first column, line 29, for the word "prolonging" read prolonged; page 4, first column, line 36, for "which" read with; and second column, line 45, for the reference numeral "56" read 58; page 7, second column, line 9, claim 7, for "memebr" read member; line 28, claim 8, for "alumium" read aluminum; and that the said Letters Patent should be read with this correction therein that the same may conform to the record of the case in the Patent Office.

Signed and sealed this 13th day of September, A. D. 1938.

Henry Van Arsdale (Seal)

Acting Commissioner of Patents.